Sept. 11, 1962  J. R. DISON, JR  3,053,590
SHAFT SEAL
Original Filed June 24, 1957  2 Sheets-Sheet 1

INVENTOR.
James R. Dison Jr.
BY
Paul Fitzpatrick
ATTORNEY

Sept. 11, 1962 J. R. DISON, JR 3,053,590
SHAFT SEAL
Original Filed June 24, 1957 2 Sheets-Sheet 2
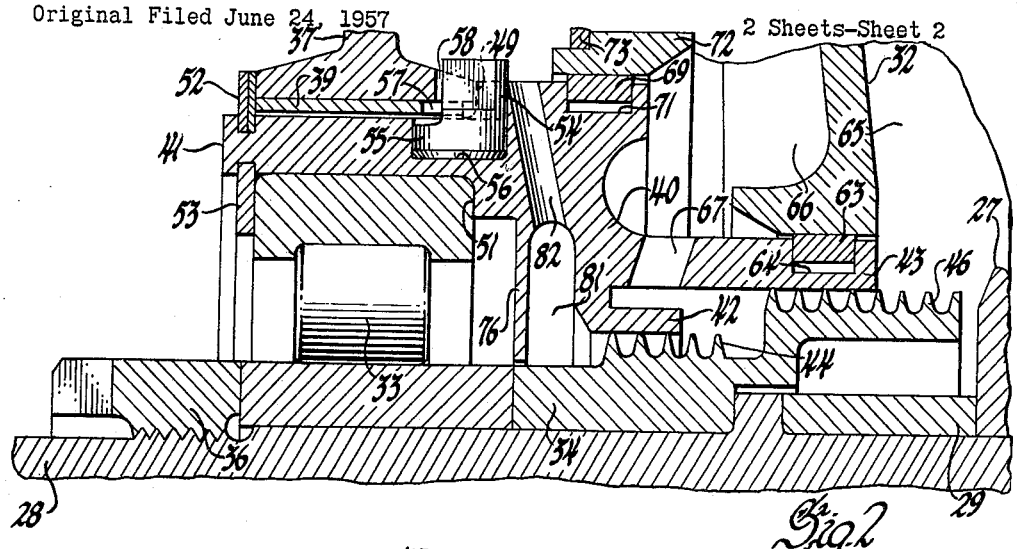
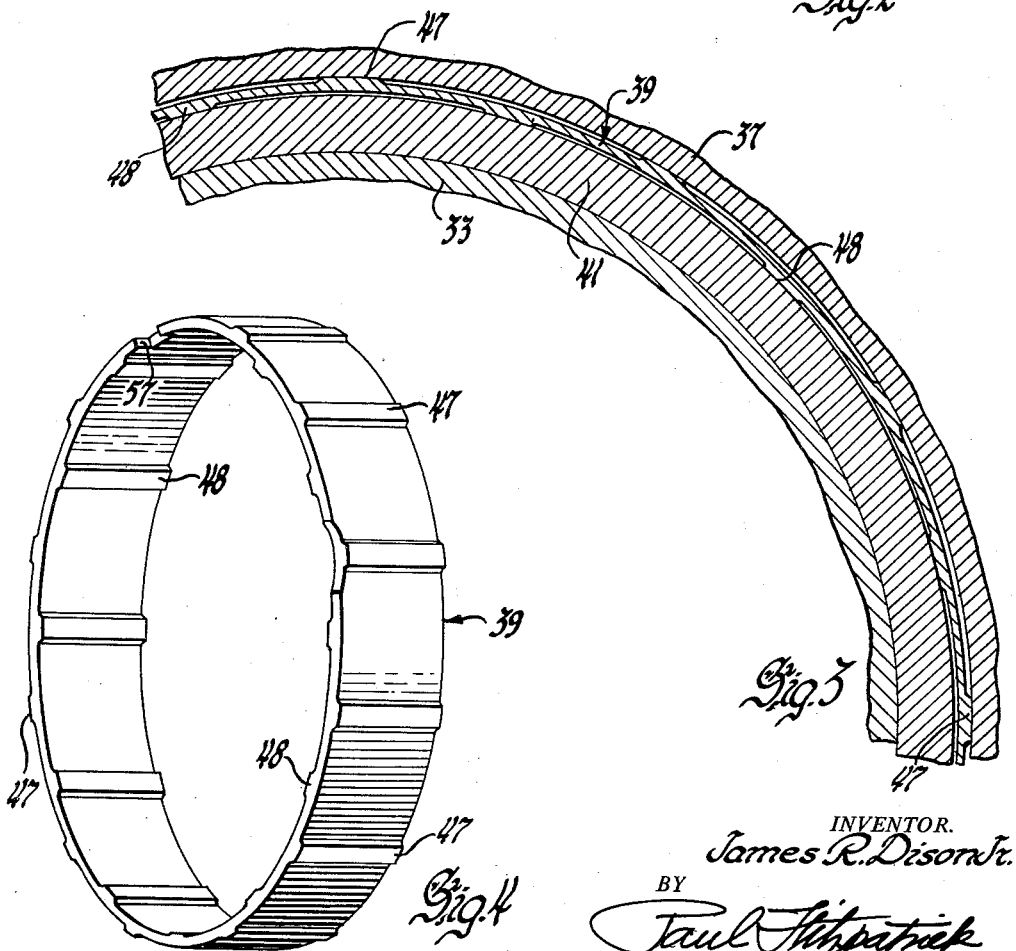
INVENTOR.
James R. Dison Jr.
BY Paul Fitzpatrick
ATTORNEY

United States Patent Office 3,053,590
Patented Sept. 11, 1962

3,053,590
SHAFT SEAL
James R. Dison, Jr., Pittsboro, Ind., assignor to General Motors Corporation, Detroit, Mich., a corporation of Delaware
Continuation of application Ser. No. 667,560, June 24, 1957. This application Sept. 24, 1959, Ser. No. 842,168
10 Claims. (Cl. 308—184)

This application is a continuation of my co-pending application Serial No. 667,560, filed June 24, 1957, entitled Shaft Seal, now abandoned.

My invention relates to seals for rotating shafts and is particularly directed to the sealing requirements of bearings in gas turbines and the like. The invention is described herein with respect to its preferred embodiment as a seal at the inlet end of the turbine of a gas turbine engine.

One of the most difficult shaft seal problems is encountered at the inlet end of a gas turbine. A bearing must be provided for the shaft and it must be lubricated. A seal must be provided to keep the lubricating oil out of the turbine and to keep air or gas from leaking from the turbine into the bearing. Any leakage of the motive fluid, or of compressor discharge air employed as a buffer ahead of the seal, creates a serious loss in engine efficiency. To add to the difficulties, it has been found desirable to provide a resilient support for the turbine bearing so that vibrations resulting from minor unbalance of the rotor or shaft will be isolated from the frame of the engine. One prior approach to such situation has been to use contact type seals, but these are complicated and are not entirely without troubles.

Labyrinth seals have also been employed, but, so far as I am aware, I am the first to mount the labyrinth seal so that the stationary member of the seal follows the radial oscillations of the shaft in the resilient mount. As a result of this improvement, clearance of the labyrinth seal may be maintained at a minimum value with consequent minimization of the leakage.

The invention also comprises means for providing controlled pressure on the seal to minimize leakage of gas.

Other features of the seal arrangement which contribute to its effective performance will be apparent from the detailed description of the preferred structure.

The principal objects of the invention are to provide an improved seal, particularly one suited for gas turbines, to provide a labyrinth seal of minimum clearance for a resiliently mounted shaft, and to provide a structurally simple seal arrangement most effective in preventing interchange of oil and gas along the turbine shaft.

The nature of the invention and the advantages thereof will be apparent to those skilled in the art from the succeeding detailed description of the preferred embodiment of the invention and the accompanying drawings thereof.

FIGURE 2 is an enlarged view of a portion of FIGURE 1.

FIGURE 3 is a partial transverse sectional view taken on a plane indicated by the line 3—3 in FIGURE 1.

FIGURE 4 is an axonometric view of the resilient mounting ring.

Figure 1:
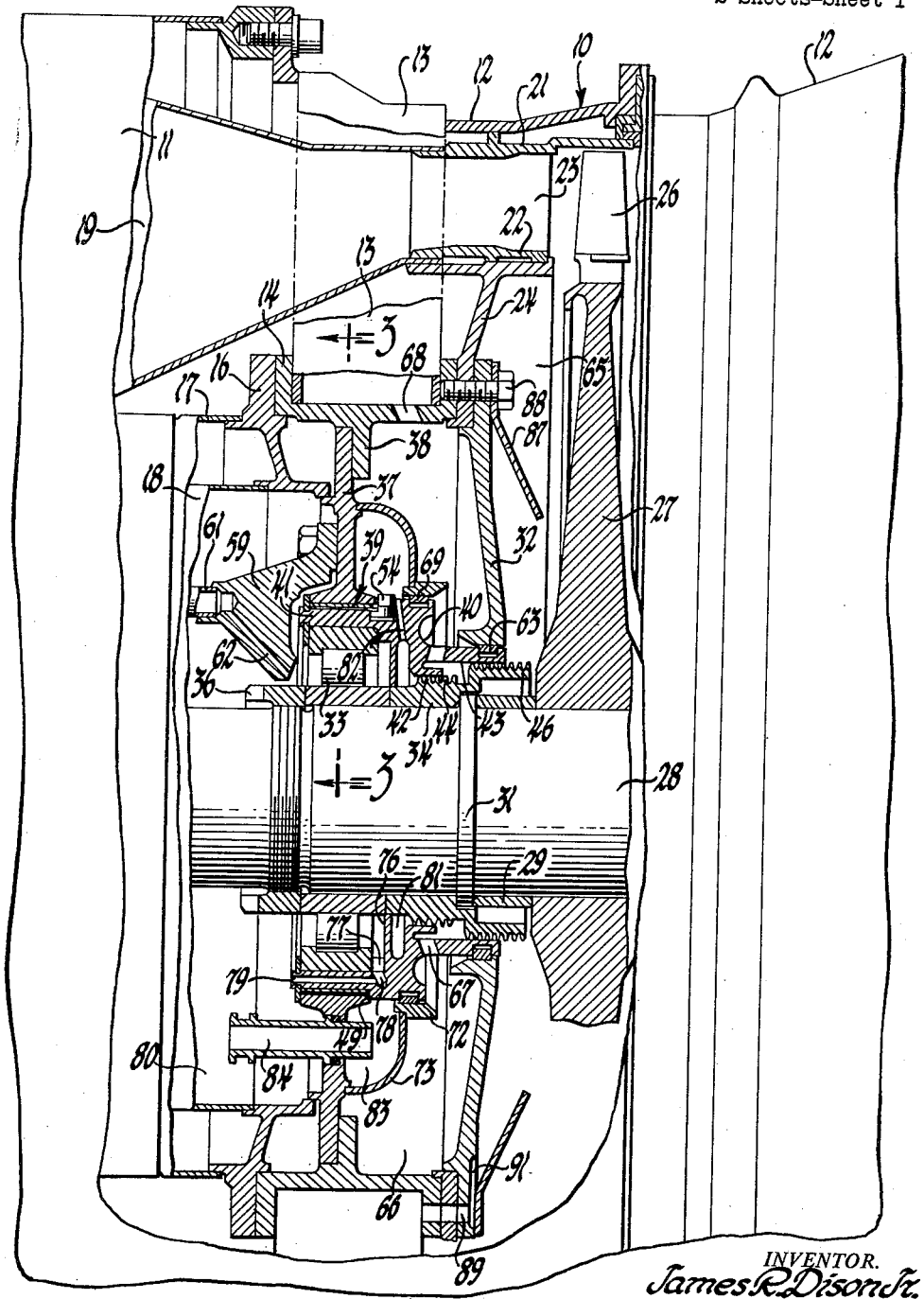
FIGURE 1 is a partial longitudinal sectional view of a gas turbine engine taken on a plane containing the axis of the engine.

The invention is illustrated herein as incorporated in a gas turbine engine of known type. Only those parts of the engine adjacent to the seal are shown, and these will be described briefly. The engine includes a turbine inlet case and turbine front bearing support 10, the front end of which is bolted to the outer combustion chamber case 11 and the rear end of which is bolted to the turbine case 12. The turbine inlet frame assembly 10 includes an outer case or wall 12, a number of hollow struts 13 fixed in the outer wall, and a rigid ring 14 fixed to the inner ends of the struts. A ring 16 at the rear end of the double-walled inner combustion section shroud is fixed to the walls 17 and 18 of the shroud and is bolted to the ring 14. Combustion liners 19 mounted between the walls 11 and 17 connect to the shrouds 21 and 22 of the first stage turbine nozzle, which also comprises vanes 23 extending between the shrouds. The outer end of one combustion liner 19 is shown. These are disposed between the struts 13, but, for clarity, the strut is shown broken away and the liner is shown in the plane of the drawing. The turbine nozzle is supported on a nozzle support ring 24 fixed to ring 14. The nozzle discharges the motive fluid against blades 26 on the first stage turbine wheel 27 fixed to the turbine shaft 28. This wheel and the other wheels (not shown) are retained on the shaft 28 by suitable means not shown. Wheel 27 abuts a spacer ring 29 which bears against a flange 31 on the shaft. An annular plate 32 fixed to the supporting ring 14 substantially closes the space ahead of the wheel 27 within the ring 14.

Shaft 28 is supported by a roller bearing 33, and another bearing (not shown) supports the turbine exhaust end of shaft 28. An inner labyrinth seal ring 34 and the inner race of bearing 33 are held against flange 31 by a nut 36 threaded on the shaft. The outer race of bearing 33 is supported from the outer shell 12 through struts 13, ring 14 and an annular supporting plate 37 fixed to an inwardly extending flange 38 of ring 14. A resilient ring 39, shown more clearly in FIGURES 3 and 4, mounted on the inner opening of plate 37, supports a bearing cage 41 within which the outer race of bearing 33 is supported. The bearing cage is a part of a bearing cage and stationary labyrinth seal member 40. Member 40 also includes two cylindrical parts 42 and 43 of progressively greater diameter which provide the stationary parts of a stepped two-stage labyrinth seal. Part 42 cooperates with labyrinth seal ribs 44 and part 43 with rib 46 on the rotating seal member 34.

Proceeding to the resilient support for bearing 33 and seal member 40, the resilient ring 39 which mounts between the supporting plate 37 and bearing cage 41 is provided with a number of axially extending ribs 47 on the outer surface and 48 on the inner surface, these ribs alternating. The ring 39 is out of contact with the plate 37, except at the ribs 47, and with the cage 41 except at the ribs 48. As will be apparent, this provides a structure which locates the bearing but which is resilient or springy in a radial direction so that it permits a small amount of oscillation of part 40, bearing 33 and shaft 28. The member 40 has a forwardly facing step or abutment 49 which engages the rear face of supporting plate 37 and an abutment 51 on its inner surface which engages the outer race of bearing 33. Member 40 is retained in its support 37 by a snap ring 52 lodged in a groove in the outer surface of the cage portion 41 and the bearing is retained in the cage by a snap ring 53 mounted in an internal groove in the cage. The bearing is a close fit in the cage.

The member 40 and the resilient ring 39 are prevented from rotating by a key 54, the head 55 of which is received in a pocket 56 in the outer surface of cage portion 41 and which extends through a notch 57 in the edge of ring 39 and a notch 58 in the margin of support plate 37.

An oil jet fitting 59 fixed to the plate 37 and supplied with oil under pressure through pipe 61 discharges the oil through nozzle 62 into the bearing 33.

A piston ring seal 63 mounted in a groove 64 at the rear end of member 40 provides a seal against plate 32 preventing gas flow from the chamber 65 between turbine wheel 27 and plate 32 into the chamber 66 ahead of plate 32, except such as may leak through the labyrinth seal 43, 46. The gas which leaks through this labyrinth seal is vented through a number of holes 67 in the stationary seal member 40 into chamber 66 and may escape from the chamber through one or more openings 68 in the ring 14 communicating with the interior of hollow struts 13 which are vented to atmosphere.

A second piston ring seal is provided between chamber 66 and the bearing 33. This seal comprises a piston ring 69 mounted in a groove 71 in the member 40 and bearing against a ring 72 connected to the support plate 37 by a dished sheet metal ring 73. The two piston ring seals permit axial movement and radial oscillation of the shaft and labyrinth seals while preventing any bypassing of the labyrinth seals by gas or oil.

An annular baffle 76 extends from the inner surface of member 40 into close proximity to the outer surface of member 34 which rotates with the shaft. This baffle tends to intercept most of the oil which flows through bearing 33. Between the outer race of the bearing and the baffle 76, a number of pockets 77, preferably twelve, are cut in the inner surface of bearing cage portion 41. Each of these pockets is connected by a radial drilled opening 78 and a drilled passage 79 extending axially of the bearing cage with the front face of the cage. Oil passing through the bearing may flow back through the passages 79 to the forward face of the bearing and into the space 80 within the combustion chamber inner wall 18 which defines a bearing housing or sump from which the oil returning from the bearing is pumped according to usual practice by a scavenge pump (not shown) to an oil reservoir for recirculation.

The space 81 between the inner labyrinth seal 42, 44 and the baffle 76 communicates with the exterior of the member 40 through a number of radial passages 82. There are preferably 12 of these located between the bores 78. These passages 82 discharge air or gas leaking through the inner labyrinth seal into the space 83 between plates 37 and 73. The space 83 communicates through a fitting 84 with the sump 80.

As will be apparent, the space 65 communicates with the motive fluid path through the gap between the first stage nozzle support 24 and the turbine wheel 27 and is thus under a pressure corresponding to the discharge pressure of the turbine nozzle. A limited amount of combustion chamber jacket air, that is, compressor discharge air which has flowed through the annular space between the walls 11 and 17 without entering the combustion liners 19, is supplied to the space 65. This air provides a buffer or curtain of clean air between the seals and the motive fluid and leaks through the space ahead of the turbine wheel into the motive fluid path at nozzle discharge pressure.

The structure by which this air is supplied and directed comprises an annular conical baffle 87, the rim of which is mounted against plate 32 by cap screws 88 which mount the baffle 87, plate 32 and nozzle support 24 on the ring 14. A number, preferably six, of holes 89 are provided through the ring 14, support 24 and plate 32 between cap screws 88. At each hole 89, a slot 91 is cut in the rear face of plate 32. The combustion chamber jacket air flows through holes 89 and slots 91 and is diffused between plate 32 and baffle 87 and outwardly over the face of the turbine wheel. This air cools the turbine wheel slightly, but its principal function is to exclude the contaminated and hotter motive fluid from the region of the seals and bearing.

The space 65 is at substantial pressure which varies with altitude but which may reach a value of the order of 150 lbs. per sq. in. The pressure in sump 80 is approximately atmospheric. The space 66 which communicates through passages 67 with the space between the two labyrinth seals is held at a pressure slightly above atmospheric. There is thus a slight pressure drop across the second stage labyrinth seal 44 and a small leakage of hot air through this seal. The small positive pressure, however, insures that leakage will take place in the direction toward the bearing so that oil will not escape rearwardly along the shaft against this pressure difference. The pressure in chamber 66 is preferably maintained at about 5 lbs. per sq. in. above atmospheric by dimensioning the hole or holes 68 which vent the space so that the amount of air which leaks through the first stage labyrinth seal will provide a 5 or 6-lb. pressure drop through orifices 68 at the maximum value of pressure in space 65.

The actual size of these orifices will vary with the amount of leakage found to occur through the first stage seal. In a particular case, the desired pressure difference was developed by providing three holes approximately a third of an inch in diameter. In this case, the first stage labyrinth seal is about four inches in diameter.

It will be apparent from the foregoing that the invention provides a very satisfactory solution to the problem of maintaining minimum labyrinth seal clearance notwithstanding the floating mounting of the shaft and thus makes it possible to provide a labyrinth seal with small leakage and to dispense with the troublesome contact type seals. The arrangement by which the pressure drop across the labyrinth seal is principally in the first stage seal, with a small drop sufficient to prevent reverse oil flow in the second stage seal, limits flow of hot air to the bearing to such a small amount of flow that it is entirely immaterial in view of the amount of heat received by the bearing through conduction and radiation.

The detailed description of the preferred embodiment of the invention for the purpose of explaining the principles thereof is not to be construed as limiting or restricting the invention, as many modifications may be made by the exercise of skill in the art without departing from the principles of the invention.

I claim:

1. A shaft bearing and seal arrangement comprising, in combination, a support, a shaft, a bearing on the shaft, a cage mounting the bearing, a resilient means yieldable radially of the shaft mounting the cage in the support, a two-stage labyrinth seal comprising parts rotating with the shaft and stationary parts, the stationary part of each stage of the seal being rigid with the bearing cage, means creating a pressure drop across the seal toward the bearing, and means venting the labyrinth seal between the stages providing an interstage pressure higher than the ambient pressure at the bearing.

2. A shaft bearing and seal arrangement comprising, in combination, a support, a shaft, a bearing on the shaft, a turbine wheel on the shaft adjacent the bearing, a cage mounting the bearing, a resilient ring yieldable radially of the shaft mounting the cage in the support, a labyrinth seal between the bearing and the turbine wheel comprising a part rotating with the shaft and a stationary part, the stationary part of the seal being rigid with the bearing cage, means providing uncontaminated air under pressure between the turbine wheel and the labyrinth seal, and means providing a restricted bleed orifice to ambient pressure from an intermediate part of the labyrinth seal.

3. In a gas turbine engine, in combination, a turbine rotor wheel, a shaft therefor, a bearing supporting the shaft adjacent the wheel, a two-stage rotating labyrinth seal member on the shaft between the bearing and the wheel, a two-stage stationary labyrinth seal member mounted rigidly with the bearing and cooperating with the rotating seal member to provide first and second stage labyrinth seals, two mutually spaced fixed walls connected to the stationary seal member and isolating the external surface of the stationary seal member from the turbine wheel, a support rigidly connected to the walls, means mounting the stationary seal member and the bearing in the support; the space between the turbine and the wall adjacent thereto containing gas at substantial pressure, the space between the walls being isolated by the first stage labyrinth seal from the firstmentioned space, the bearing being isolated from the secondmentioned space by the second stage labyrinth seal, the bearing being in a space at substantially atmospheric pressure; and means providing a restricted vent to atmosphere from between the two seal stages to maintain a low superatmospheric pressure between the seal stages due to escape through the vent of gas leaking through the first stage seal.

4. In a gas turbine engine, in combination, a turbine rotor wheel, a shaft therefor, a bearing supporting the shaft adjacent the wheel, a two-stage rotating labyrinth seal member on the shaft between the bearing and the wheel, a two-stage stationary labyrinth seal member mounted rigidly with the bearing and cooperating with the rotating seal member to provide first and second stage labyrinth seals, two mutually spaced fixed walls isolating the external surface of the stationary seal member from the turbine wheel, a support rigidly connected to the walls and supporting the bearing, the space between the turbine and the wall adjacent thereto containing gas at substantial pressure, the space between the walls being isolated by the first stage labyrinth seal from the firstmentioned space, and the bearing being isolated from the secondmentioned space by the second stage labyrinth seal, the bearing being in a space at substantially atmospheric pressure; means providing a restricted vent to atmosphere from between the two seal stages to maintain a low superatmospheric pressure between the seal stages due to escape through the vent of gas leaking through the first stage seal; a baffle extending radially from the stationary seal member into close proximity to the shaft between the bearing and the secondary seal member; and passages providing vents from each side of the baffle to the space containing the bearing.

5. In a gas turbine engine, in combination, a turbine rotor wheel, a shaft therefor, a bearing supporting the shaft adjacent the wheel, a two-stage rotating labyrinth seal member on the shaft between the bearing and the wheels, a two-stage stationary labyrinth seal member mounted rigidly with the bearing and cooperating with the rotating seal members to provide first and second stage labyrinth seals, two mutually spaced fixed walls isolating the external surface of the stationary seal member from the turbine wheel, a radially yieldable contact seal between each wall and the stationary seal member, a support rigidly connected to the walls, a radially resilient member mounting the stationary seal member and the bearing in the support with limited freedom for radial movement; the space between the turbine and the wall adjacent thereto containing gas at substantial pressure, the space between the walls being isolated by the first stage labyrinth seal from the first mentioned space, and the bearing being isolated from the second mentioned space by the second stage labyrinth seal, the bearing being in a space at substantially atmospheric pressure; and means providing a restricted vent to atmosphere from between the two seal stages to maintain a low superatmospheric pressure between the seal stages due to escape through the vent of gas leaking through the first stage seal.

6. In a gas turbine engine, in combination, a turbine rotor wheel, a shaft therefor, a bearing supporting the shaft adjacent the wheel, a two-stage rotating labyrinth seal member on the shaft between the bearing and the wheel, a two-stage stationary labyrinth seal member mounted rigidly with the bearing and cooperating with the rotating seal member to provide first and second stage labyrinth seals, two mutually spaced fixed walls isolating the external surface of the stationary seal member from the turbine wheel, a radially yieldable contact seal between each wall and the stationary seal member, a support rigidly connected to the walls, a radially resilient member mounting the stationary seal member and the bearing in the support with limited freedom for radial movement; the space between the turbine and the wall adjacent thereto containing gas at substantial pressure, the space between the walls being isolated by the first stage labyrinth seal from the first mentioned space, and the bearing being isolated from the second mentioned space by the second stage labyrinth seal, the bearing being in a space at substantially atmospheric pressure; means providing a restricted vent to atmosphere from between the two seal stages to maintain a low superatmospheric pressure between the seal stages due to escape through the vent of gas leaking through the first stage seal; a baffle extending radially from the stationary seal member into close proximity to the shaft between the bearing and the secondary seal member; passages providing vents from each side of the baffle to the space containing the bearing; and means for supplying uncontaminated air under pressure into the first-mentioned space.

7. A shaft bearing and seal arrangement comprising, in combination, a support, a shaft, a bearing on the shaft, a turbomachine rotor on the shaft adjacent the bearing, a cage mounting the bearing, resilient means yieldable radially of the shaft mounting the cage in the support, a plate surrounding the shaft isolating the bearing from the rotor, a labyrinth seal between the bearing and the rotor comprising a part rotating with the shaft and a stationary part rigid with the bearing cage, and a radially yieldable contact seal between the stationary part and the said plate.

8. A shaft bearing and seal arrangement comprising, in combination, a support, a shaft, a bearing on the shaft, a turbomachine rotor on the shaft adjacent the bearing, a cage mounting the bearing, resilient means yieldable radially of the shaft mounting the case in the support, a plate surrounding the shaft isolating the bearing from the rotor, a labyrinth seal between the bearing and the rotor comprising a part rotating with the shaft and a stationary part rigid with the bearing cage, a radially yieldable contact seal between the stationary part and the said plate, means supplying air to the space between the plate and the rotor at a pressure higher than the air pressure at the bearing, and means providing a restricted vent from an intermediate part of the labyrinth seal to a pressure equal to that at the bearing.

9. A shaft bearing and seal arrangement comprising, in combination, a support, a shaft, a bearing on the shaft, a turbomachine rotor on the shaft adjacent the bearing, a cage mounting the bearing, resilient means yieldable radially of the shaft mounting the cage in the support, two spaced plates surrounding the shaft isolating the bearing from the rotor, a two-stage labyrinth seal between the bearing and the rotor comprising a part rotating with the shaft and a stationary part rigid with the bearing cage, a radially yieldable contact seal between the stationary part and each said plate, means providing a restricted vent from the labyrinth seal between the stages through the space between the plates, and means supplying air under pressure to the space between the rotor and the plate nearer thereto.

10. In a gas turbine engine, in combination, a shaft, a hollow cooling jacket surrounding said shaft in spaced relation thereto and containing cooling fluid therein, a bearing on said shaft adjacent said jacket, means mounted between said jacket and said shaft forming a labyrinthian passage therebetween open at its opposite ends, said cooling jacket being in communication with one end of said labyrinthian passage, an outlet for said cooling fluid communicating with about the mid-portion of said labyrinthian passage, and means enclosing a portion of said bearing and forming a chamber for receiving lubricating oil therein, said last mentioned means including a fluid flow intercepting member interposed between said bearing and said labyrinthian passage for restricting the flow of fluid therebetween.

References Cited in the file of this patent
UNITED STATES PATENTS 2,841,455   Perrier _____ July 1, 1958